3,301,757
ANALEPTIC COMPOSITIONS AND METHOD

Carl D. Lunsford, Richmond, and Albert D. Cale, Jr., Bon Air, Va., assignors to A. H. Robins Company, Incorporated, Richmond, Va., a corporation of Virginia
Filed May 26, 1965, Ser. No. 458,918
47 Claims. (Cl. 167—65)

The present application is a continuation-in-part of our prior-filed copending application Serial No. 237,283, filed November 13, 1962, now U.S. Patent 3,192,206, issued June 29, 1965, in which a requirement for restriction is of record, which application is in turn a division of Serial No. 156,945, filed December 4, 1961 now U.S. Patent No. 3,192,221, itself a continuation-in-part of Serial No. 88,036, filed February 9, 1961 now U.S. Patent No. 3,192,230. The present invention relates to certain heterocyclic organic compounds which may be referred to as 4-(omega-substituted alkyl)-2-pyrrolidinones and 4-(omega-substituted alkyl)-2-thionpyrrolidinones and is more particularly concerned with compositions of 4-(omega-substituted alkyl) - 3,3-disubstituted-1-substituted-2-pyrrolidinones and 4-(omega-substituted alkyl)-3,3-disubstituted-1-substituted-2-thionpyrrolidines and a method of treating therewith. The invention is especially concerned with such compositions and method which embody or employ (I) a compound of the formula:

wherein: A is lower-alkyl, cycloalkyl, monocarbocyclic aryl, or monocarbocyclic aralkyl; R is lower-alkyl, lower-alkenyl, cycloalkyl, monocarbocyclic aryl, monocarbocyclic aralkyl, pyridyl, thienyl, or thenyl; R' is lower-alkyl, lower-alkenyl, cycloalkyl, cycloalkenyl, monocarbocyclic aryl, or monocarbocyclic aralkyl; R" is hydrogen or methyl, a maximum of one R" being other than hydrogen; $n$ is zero or one; AM is amino, N-lower-alkanoylamino, and phthalimido, and E is oxygen or sulfur, or (II) an acid addition salt thereof.

The compounds of the invention having the foregoing formula are generally characterized by important pharmacological activity, indicative of their use in counteracting certain physiological abnormalities in an animal body. The compounds are analeptics. Certain compounds of the series are extremely potent and long acting analeptics, stimulating respiration and antagonizing central nervous system depression and exhibiting a particularly durable antagonism against barbiturate-induced depression or poisoning at dose levels considerably below that at which untoward side effects appear. The morpholino compounds are especially potent analeptics. The compounds which are strong analeptics are generally also hypertensives.

It is accordingly an object of this invention to provide novel and useful compositions embodying certain 4-(omega-substituted alkyl)-2-pyrrolidinones and -2-thionpyrrolidinones as active ingredient and a method for the treatment of a living animal body therewith. Other objects of the invention will be apparent to one skilled in the art, and still other objects will become apparent hereinafter.

Figure 1:
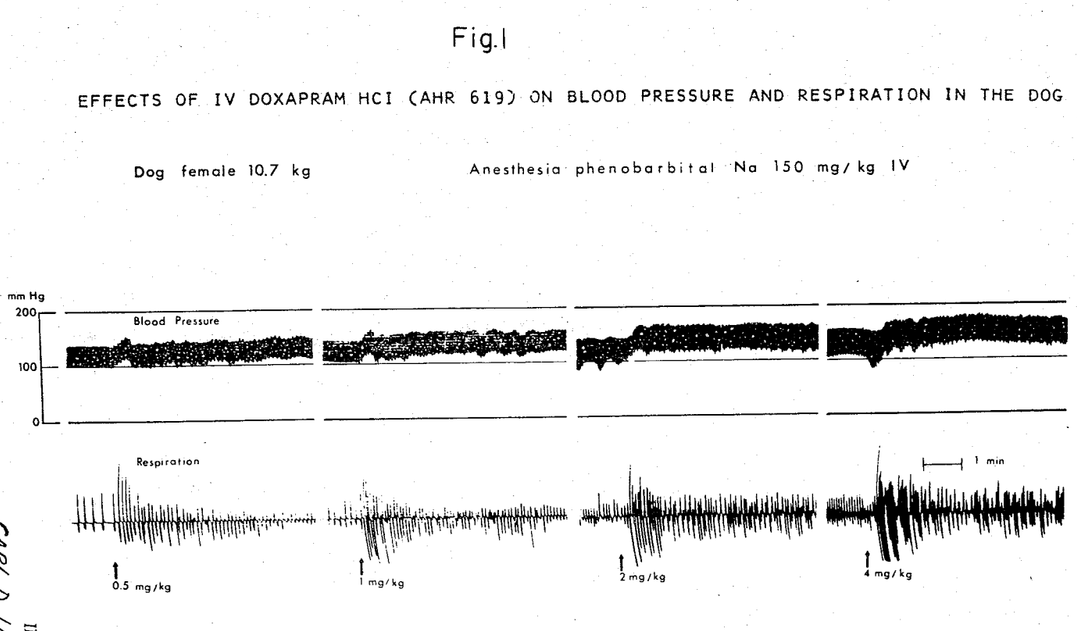
FIG. 1 is a blood pressure and respiration chart showing the effects of a representative composition of the invention in an anesthetized dog. "Doxapram hydrochloride" is the non-proprietary or generic name for the compound AHR 619.
Figure 2:
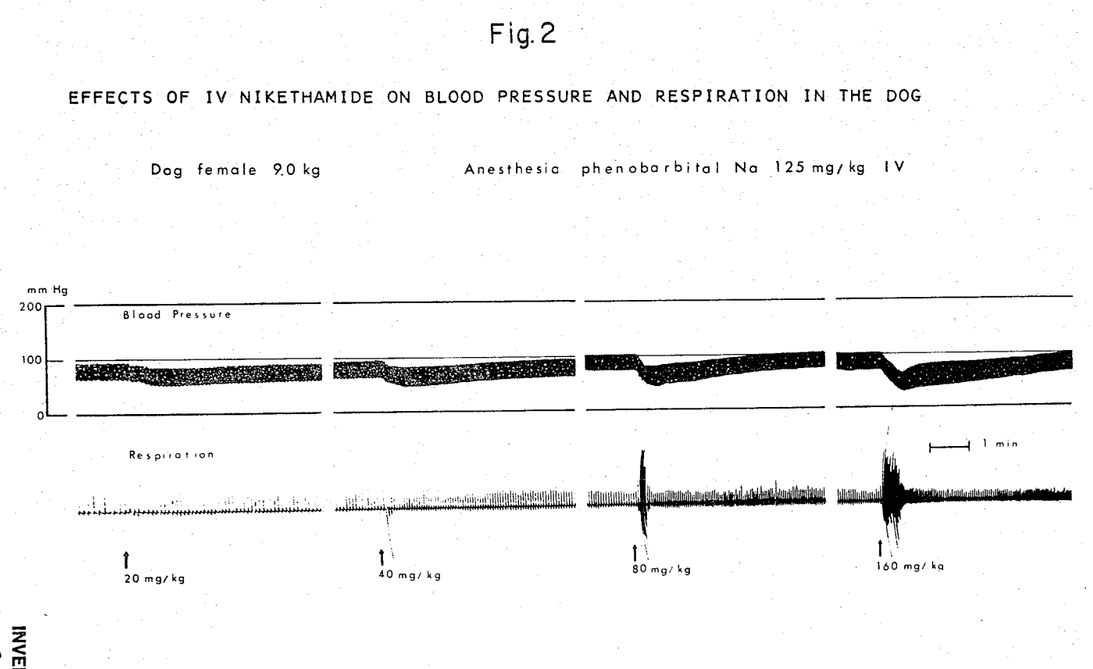
FIG. 2 is a chart which shows the same thing for the compound nikethamide.
Figure 3:
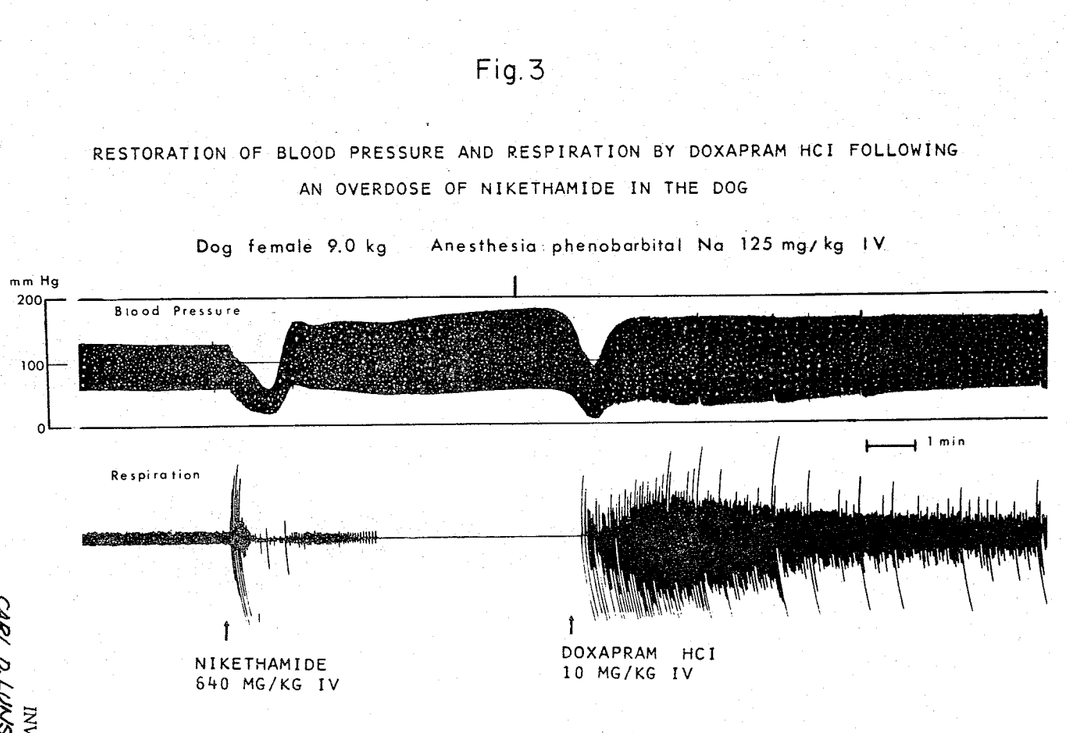
FIG. 3 is a chart which shows restoration of respiration and blood pressure using a composition of the present invention after an overdose of nikethamide.

In the definitions of symbols in the foregoing formula and where they appear elsewhere throughout this specification, the terms have the following significance.

By "monocarbocyclic aryl" radical is meant an aryl radical of the benzene series, having six ring carbon atoms, and this term includes the unsubstituted phenyl radical and phenyl radicals substituted by any radical or radicals which are not reactive or otherwise interfering under conditions of the reaction, such as nitro, lower-alkoxy, lower-alkylmercapto, lower-alkyl, halo, and the like. The substituted-phenyl radicals have preferably no more than one to three substituents such as those given above and, furthermore, these substitutents can be in various available positions of the phenyl nucleus and, where more than one substituent is present, can be the same or different and can be in various position combinations relative to each other. The lower-alkyl, lower-alkoxy, and lower-alkylmercapto substituents each have preferably from one to three carbon atoms which can be arranged as straight or branched chains. A total of fifteen carbon atoms in the "monocarbocyclic aryl" radical is the preferred maximum.

In the foregoing definition of R, certain cyclic radicals are referred to. When pyridyl is referred to, e.g., the 3- or 4-pyridyl radicals are included. When thienyl or thenyl radicals are referred to, these may be for example, the 3-thienyl or 2- or 3-thenyl radicals.

The term "lower-alkyl" as used herein includes straight and branched chain radicals of up to eight carbon atoms inclusive and is exemplified by such groups as methyl, ethyl, propyl, isopropyl, tertiary butyl, amyl, isoamyl, hexyl, heptyl, octyl, and the like. The term "alkenyl" includes straight and branched chain radicals of two up to eight carbon atoms inclusive and includes such groups as vinyl, allyl, methallyl, 4-pentenyl, 3-hexenyl, and 3-methyl-3-heptenyl. The term "cycloalkyl" as used herein includes primarily cyclic alkyl radicals containing three up to nine carbon atoms inclusive and encompasses such groups as cyclopropyl, cyclobutyl, cyclohexyl, cyclopentyl, methylcyclohexyl, propylcyclohexyl, ethylcyclopentyl, propylcyclopentyl, dimethylcyclohexyl, cycloheptyl, and cyclooctyl. The term "cycloalkenyl" as used herein includes cyclic alkenyl radicals containing up to nine carbon atoms inclusive and encompasses such usual radicals as 1- and 2-cyclohexenyl and 1- and 2-cyclopentenyl. Included in the term "aralkyl" are lower-alkyl substituted mono-carbocyclic aryl groups such as benzyl, phenethyl, methylbenzyl, phenpropyl and the like. The radicals R and R' in the above formula, as stated in the foregoing, are inclusive of such groups as lower-alkyl, cycloalkyl, and aralkyl, and are preferably although not necessarily radicals of a solely hydrocarbon nature.

When halogen is referred to herein, preferably but not necessarily a halogen of atomic weight in excess of 19 is employed. Of the halogens, chlorine is preferred.

Among the suitable amino radicals included within the symbol AM are primary, secondary and tertiary amino radicals, such as unsubstituted amino (—NH$_2$), (lower-alkyl)-amino; di-(lower-alkyl)-amino; (lower-alkeny)-amino; di(lower-alkenyl)-amino; phenylamino; (hydroxy-lower-alkyl) - amino; di(hydroxy-lower-alkyl)-amino; basic saturated monocyclic heterocyclic radicals of less than twelve carbon atoms, as exemplified by piperidino; (lower-alkyl)-piperidino, e.g., 2-, 3-, or 4-(lower-alkly)-piperidino; di-(lower-alkyl)-piperidino, e.g., 2,4-, 2,6-, or 3,5-di-(lower-alkyl)-piperidino; (lower-alkoxy)-piperidino; pyrrolidino; (lower-alkyl) - pyrrolidino; di-(lower-alkyl) - pyrrolidino; (lower-alkoxy)-pyrrolidino; morpholino; (lower-alkyl)-morpholino; poly-(lower-alkyl)-morpholino; (lower-alkoxy)-morpholino; thiomorpholino; (lower-alkyl) - thiomorpholino; poly-(lower-alkyl)-thiomorpholino; (lower-alkoxy) - thiomorpholino; piperazino; (lower-alkyl)-piperazino (e.g., C- or N$^4$-methylpiperazino), di-C-(lower-alkyl)-piperazino; N$^4$-(lower-alkyl)-C-(lower-alkyl)-piperazino; N-(hydroxy-lower-alkyl)-piperazino; N-(lower-aliphatic acyloxy lower-alkyl)-piperazino [e.g., N-acetoxy-, isobutyroxy-, or octanoyl-oxyethyl or propyl)-piperazino]; (lower-alkoxy)-piperazino; and (lower-carbalkoxy)-piperazino. The terms "lower alkyl" and "lower alkoxy," as employed in this paragraph, have the definitions assigned elsewhere herein.

Since AM is amino, the compounds of the foregoing formula may be converted to acid addition salts by reaction of the free base with the selected acid, preferably in the presence of an organic solvent inert to the reactants under the conditions of reaction and under substantially anhydrous conditions. When the compounds are to be used as pharmaceuticals, they are most conveniently used in the form of water-soluble, non-toxic acid-addition salts. The acids which can be used to prepare the preferred non-toxic acid-addition salts are those which produce, when combined with the free bases, salts whose anions are relatively innocuous to the animal organism in therapeutic doses of the salts, so that beneficial physiological properties inherent in the free bases are not vitiated by side-effects ascribable to the anions. Appropriate acid-addition salts are those derived from mineral acids such as hydrochloric acid, hydrobromic acid, hydriodic acid, nitric acid, sulfuric acid and phosphoric acid; and organic acids such as acetic acid, citric acid, lactic acid, and tartaric acid.

The acid-addition salts are prepared either by dissolving the free base in an aqueous solution containing the appropriate acid and isolating the salt by evaporating the solution, or by reacting the free base and the selected acid in an organic solvent, in which case the salt separates directly or can be obtained by concentration of the solution. If two or more equivalents of acid are used, a poly-acid-addition salt is obtained in those instances where there is more than one basic nitrogen atom in the molecule. If one equivalent of acid is used a mono-acid-addition salt is obtained.

The present invention provides valuable pharmaceutical compositions of pharmacologically-active organic compounds, having an omega-substituted alkyl substituent in the four position, and a method of treating therewith. Although pyrrolidinones having substituents on the 1-nitrogen atom are known, to the best of our knowledge no compounds of the present type, having a substituted alkyl group attached to the 4-position of the 2-pyrrolidinone or 2-thiopyrrolidinone ring, substitution in the 1-position, and disubstitution in the 3-position of said ring, have heretofore been known or preparable by any method, neither have the starting materials therefor been known heretofore. The preferred compounds for all purposes are the 3,3-diaryl compounds, especially the 1-lower-alkyl-3,3-diphenyl compounds.

The compounds which are utilized as active ingredient in the compositions and method of the invention are described and claimed per se in parent application Serial No. 237,283, now U.S. Patent 3,192,206, and are prepared as disclosed therein. The disclosure of the said U.S. Patent 3,192,206 is hereby incorporated into this application in toto by reference and by reference made a part hereof. Of the compounds, falling within the scope of the foregoing broad formula, disclosed in the said U.S. patent, the following type compounds and species deserve special attention, it being understood that the compounds may be used in the form of the free base but that use in the form of an acid addition salt is preferred.

1 - lower-alkyl - 3,3-diphenyl-4-(β-morpholinoethyl)-2-pyrrolidinone,

1 - lower-alkyl-3,3-diphenyl-4-(β-morpholinoethyl)-2-pyrrolidinone pharmacologically acceptable acid addition salt, 1-ethyl-3,3-diphenyl - 4-(β-morpholinoethyl)-2-pyrrolidinone pharmacologically acceptable acid addition salt, 1 - ethyl - 3,3-diphenyl-4-(β-morpholinoethyl)-2-pyrroilidinone hydrochloride, 1-methyl - 3,3 - diphenyl-4-(β-morpholinoethyl)-2-pyrrolidinone, 1 - lower-aklyl - 3,3-diphenyl-4-(β-morpholinoethyl)-2-pyrrolidinethione pharmacologically acceptable acid addition salt, 1 - isopropyl - 3,3-diphenyl-4-(β-morpholinoethyl)-2-pyrrolidinone pharmacologically acceptable acid addition salt, 1 - isopropyl - 3,3-diphenyl-4-(β-morpholinoethyl)-2-pyrrolidinone hydrochloride, 1 - lower-alkyl-3,3-diphenyl-4-[β-(methylmorpholino)-ethyl]-2-pyrrolidinone non-toxic acid addition salt, 1 - lower-alkyl - 3,3-diphenyl-4-[β-(2,6-dimethylmorpholino)ethyl]-2-pyrrolidinone pharmacologically acceptable acid addition salt, 1 - lower-alkyl - 3,3-diphenyl-4-[β(-3,5-dimethylmorpholino)-ethyl]-2-pyrrolidinone pharmacologically acceptable acid addition salt, 1 - lower-alkyl - 3-cycloalkyl-3-phenyl-4-(β-morpholinoethyl)-2-pyrrolidinone non-toxic acid addition salt, wherein the 3-cycloalkyl group has up to a maximum of nine carbon atoms, 1 - lower-alkyl - 3,3-diphenyl-4-(β-thiomorpholinoethyl)-2-pyrrolidinone pharmacologically acceptable acid addition salt, 1 - lower-alkyl - 3,3-diphenyl-4-(3-morpholino-2-propyl)-2-pyrrolidinone pharmacologically acceptable acid addition salt, 1 - lower-alkyl - 3,3-diphenyl-4-(gamma-morpholinopropyl) - 2-pyrrolidinone pharmacologically acceptable acid addition salt, 1 - lower-alkyl - 3-cyclopentyl-3-phenyl-4-(β-morpholinoethyl)-2-pyrrolidinone pharmacologically acceptable acid addition salt, 1 - lower-alkyl - 3,3-diphenyl-4-(β-dilower-alkylaminoethyl)-2-pyrrolidinone, 1 - lower-alkyl - 3,3-diphenyl-4-(β-lower-alkylaminoethyl)-2-pyrrolidinone pharmacologically acceptable acid addition salt, 1 - lower-alkyl - 3,3-diphenyl-4-(β-piperidinoethyl)-2-pyrrolidinone pharmacologically acceptable acid addition salt, 1 - lower-alkyl - 3,3-diphenyl-4-(β-pyrrolidinoethyl)-2-pyrrolidinone pharmacologically acceptable acid addition salt, 1 - lower-alkyl - 3,3-diphenyl-4-(3-dilower-alkylamino-2-propyl)-2-pyrrolidinone pharmacologically acceptable acid addition salt, 1 - lower - alkyl - 3,3 - diphenyl - 4 - (β - lower-alkylamino-ethyl)-2-pyrrolidinone non-toxic acid addition salt, 1 - lower - alkyl - 3,3 - diphenyl - 4 - (β - di - lower-alkylamino-ethyl)-2-pyrrolidinethione pharmacologically acceptable acid addition salt, 1 - lower - alkyl - 3,3 - diphenyl - 4 - (β - aminoethyl)-2-pyrrollidinone, 1 - lower - alkyl - 3 - cycloalkyl - 3 - phenyl - 4 - (β-di-lower-alkylaminoethyl)-2-pyrrolidinone non-toxic acid addition salt, wherein the 3-cycloalkyl group has up to a maximum of nine carbon atoms, 1 - lower - alkyl - 3,3 - diphenyl - 4 - [β - (N - lower-alkanoyl - N - lower - alkyl amino) - ethyl] - 2 - pyrrolidinone, 1,3 - di - lower - alkyl - 3 - phenyl - 4 - (β - di- lower-alkylaminoethyl)-2-pyrrolidinone non-toxic acid addition salt, 1 - lower - alkyl - 3,3 - diphenyl - 4 - [β - (N - lower-alkylpiperazino)-ethyl]-2-pyrrolidinone non-toxic acid addition salt.

*Formulation and administration*

Effective quantities of any of the foregoing pharmacologically active compounds may be administered to a living animal body in any one of various ways, for example, orally as in capsules or tablets, parenterally in the form of sterile solutions or suspensions, and in some cases intravenously in the form of sterile solutions. The 3,3-disubstituted - 1 - lower - alkyl - 4 - aminoalkyl - 2 - pyrrolidinones and 3,3-disubstituted-1-lower-alkyl-4-aminoalkyl-2-thionpyrrolidinones, especially in the form of their acid addition salts, represent a preferred group of highly pharmacologically active compounds, of which the 1-ethyl and 1-isopropyl 4-morpholinoalkyl, especially the 4-(2-morpholinoethyl) compounds, and the corresponding 4-dilower-alkylaminoalkyl compounds, are outstandingly active. Preferred groups at the 3-position are phenyl radicals as the 3-3-diphenyl compounds are likewise outstanding in their activity.

Although very small quantities of the active materials of the present invention are effective when minor therapy is involved or in cases of administration to subjects having a relatively low body weight, unit dosages are usually five milligrams or above and preferably twenty-five, fifty or one-hundred milligrams or even higher, depending of course upon the emergency of the situation and the particular result desired. Five to fifty milligrams appears optimum per unit dose, while usual broader ranges appear to be one to 100 milligrams per unit dose. The active agents of the invention may be combined with other pharmacologically active agents, or with buffers, antacids or the like, for administration and the proportion of the active agent in the compositions may be varied widely. It is only necessary that the active ingredient constitute an effective amount, i.e., such that a suitable effective dosage will be obtained consistent with the dosage form employed. Obviously, several unit dosage forms may be administered at about the same time. The exact individual dosages as well as daily dosages in a particular case will of course be determined according to established medical principles under the direction of a physician or veterinarian. Results upon administration of these novel materials have thus far proved extremely gratifying.

The following formulations are representative for all of the pharmacologically active compounds of the invention, but have been particularly designed to embody as active ingredient a 3,3-diphenyl-1-lower-alkyl-4-aminoalkyl-2-pyrrolidinone or 3,3-diphenyl-1-lower-alkyl-4-aminoalkyl-2-pyrrolidinethione, and especially a pharmacologically acceptable salt thereof, for example the 3,3-diphenyl-1-lower-alkyl (e.g., 1-ethyl or 1-isopropyl)-4-(2-morpholinoethyl)-2-pyrrolidinone or -2-pyrrolidinethione or their hydrochlorides, hydrobromides, methiodides, or like pharmacologically acceptable salts thereof, or the corresponding 4-dilower-alkylaminoalkyl compounds.

FORMULATIONS

(1) *Capsules*

Capsules of 5 mg., 25 mg., and 50 mg. of active ingredient per capsule are prepared. With the higher amounts of active ingredient, reduction may be made in the amount of lactose.

Typical blend for encapsulation: Per capsule, mg.
  Active Ingredient, as salt ______________ 5.0
  Lactose _________________________________ 296.7
  Starch __________________________________ 129.0
  Magnesium Stearate ______________________ 4.3

Total ___________________________________ 435.0

Additional capsule formulations preferably contain a higher dosage of active ingredient and are as follows:

| Ingredients | 100 mg. per Capsule | 250 mg. per Capsule | 500 mg. per Capsule |
|---|---|---|---|
| Active Ingredient, as salt | 100.0 | 250.0 | 500.0 |
| Lactose | 231.5 | 126.5 | 31.1 |
| Starch | 99.2 | 54.2 | 13.4 |
| Magnesium Stearate | 4.3 | 4.3 | 5.5 |
| Total | 435.0 | 435.0 | 550.0 |

In each case, uniformly blend the selected active ingredient with lactose, starch, and magnesium stearate and encapsulate the blend.

(2) *Tablets*

A typical formulation for a tablet containing 5.0 mg. of active ingredient per tablet follows. The formulation may be used for other strengths of active ingredient by adjustment of weight of dicalcium phosphate.

Per tablet, mg.
(1) Active Ingredient ______________________ 5.0
(2) Corn Starch ____________________________ 13.6
(3) Corn Starch (paste) ____________________ 3.4
(4) Lactose ________________________________ 79.2
(5) Dicalcium Phosphate ____________________ 68.0
(6) Calcium Stearate _______________________ 0.9

Total ___________________________________ 170.1

Uniformly blend 1, 2, 4 and 5. Prepare 3 as a 10 percent paste in water. Granulate the blend with starch paste and pass the wet mass through an eight mesh screen. The wet granulation is dried and sized through a twelve mesh screen. The dried granules are blended with the calcium stearate and compressed.

Additional tablet formulations preferably contain a higher dosage of the active ingredient and are as follows:

A.—*50 mg. tablet*

Ingredients: Per tablet, mg.
  Active Ingredient, as salt ______________ 50.0
  Lactose _________________________________ 90.0
  Milo Starch _____________________________ 20.0
  Corn Starch _____________________________ 38.0
  Calcium Stearate ________________________ 2.0

Total ___________________________________ 200.0

Uniformly blend the active ingredient, lactose, milo starch, and corn starch. This blend is granulated using water as a granulating medium. The wet granules are passed through an eight mesh screen and dried at 140 to 160 degrees Fahrenheit overnight. The dried granules are passed through a number ten mesh screen and blended with the proper amount of calcium stearate and this blend is then converted into tablets on a suitable tablet press.

B.—*100 mg. tablet*

| Ingredients: | Per tablet, mg. |
|---|---|
| Active Ingredient, as salt | 100.0 |
| Lactose | 190.0 |
| Dicalcium Phosphate | 172.2 |
| Starch | 54.0 |
| Milo Starch | 21.6 |
| Calcium Stearate | 2.2 |
| Total | 540.0 |

Uniformly blend the active ingredient, lactose, dicalcium phosphate, starch and milo starch. This blend is granulated with water and the wet mass is passed through a number eight mesh screen. The wet granules are dried at 140–160 degrees Fahrenheit overnight. The dried granules are passed through a number ten mesh screen. These dried granules are blended with the proper weight of calcium stearate and the lubricated granules are then converted into tablets on a suitable tablet press.

C.—*250 mg. tablet*

| Ingredients: | Per tablet, mg. |
|---|---|
| Active Ingredient, as salt | 250.0 |
| Corn Starch | 56.0 |
| Carbowax 6000 (polyethylene glycol of M.W. approximately 6000) | 25.0 |
| Lactose | 35.0 |
| Magnesium Stearate | 4.0 |
| Total | 370.0 |

Uniformly blend the active ingredient, Carbowax 6000, lactose, and one-half the weight of magnesium stearate required. This blend is then "slugged" on a suitable tablet press. These "slugs" are granulated through a ten mesh screen on an oscillating granulator. These granules are then blended with the remainder of the magnesium stearate and the lubricated granules are then converted into tablets on a suitable tablet press.

D.—*500 mg. tablet*

| Ingredients: | Per tablet, mg. |
|---|---|
| Active Ingredient, as salt | 500.0 |
| Corn Starch (wet) | 86.4 |
| Milo Starch | 32.4 |
| Calcium Stearate | 3.2 |
| Corn Starch (dry) | 26.0 |
| Total | 648.0 |

Uniformly blend the active ingredient, corn starch and milo starch. This blend is wet granulated using water and the wet mass is passed through a number eight mesh screen. These wet granules are dried overnight at 140–160 degrees Fahrenheit. The dried granules are passed through a number ten mesh screen. The dried granules and weighed amounts of corn starch and calcium stearate are uniformly blended and these lubricated granules are compressed on a suitable tablet press.

(3) *Injectable—2% sterile solution*

| | Per cc. |
|---|---|
| Active Ingredient mg | 20 |
| Preservative, e.g., Chlorobutanol percent weight/volume | 0.5 |
| Water for Injection | q.s. |

Prepare solution, clarify by filtration, fill into vials, seal, and autoclave.

(4) The pharmacologically active compounds provided by the present invention may also be administered successfully by embodying an effective quantity thereof in an injectable suspension for injection into an animal body, in oral powders, suspensions or syrups, and in other acceptable dosage forms.

Representative compositions of the present invention were tested against a known analeptic, nikethamide. As purchased on the open market, this compound was supplied as a 250 mg./ml. aqueous solution.

OBJECTIVE

The purpose of these studies was to determine the relative activity of representative compounds in this series of compounds compared to nikethamide, a well known analeptic agent.

EXPERIMENTAL

*Method*

Adult mongrel dogs (either sex) were used following an overnight fast. Surgical anesthesia was induced with intravenous phenobarbital sodium, 125 to 175 mg./kg. according to the requirement in each animal. The numbers of animals employed were: 1 to 5 with each AHR compound; and 5 with nikethamide. A Grass Model 5 Polygraph was used for recording blood pressure from a carotid artery (Statham P23AC transducer) and respiration from a tracheal cannula (Grass Model PT5A Volumetric Low Pressure Transducer). Changes in the level of anesthesia were determined by gross observation of the animal and by application of stimuli appropriate for investigating the functional integrity of pain, blink and corneal reflexes.

Aqueous or propylene glycol solutions of experimental compounds were administered via a femoral vein. In most instances the initial dose was 1 mg./kg. and each subsequent dose was doubled at 10 to 30 minute intervals until pharmacologic and/or lethal effects were produced. If such doses proved to be too high (e.g., certain AHR compounds) or too low (e.g., nikethamide), the proper adjustment was made in subsequent experiments.

*Results*

The results of this study are summarized in Table I. All AHR compounds were capable of markedly increasing the depth and frequency of breathing (respiration). In addition to the respiratory effect, all AHR compounds were found to be potent antagonists of the central nervous system depressant properties of the anesthetic agent.

Both magnitude and duration of the stimulant effect on respiration of the anesthetized dog were increased as the dose of AHR compounds was increased. Indeed, it was frequently possible to stimulate respiration for several hours following a single injection. Analeptic effects such as restoration of the integrity of blink, corneal, and pan reflexes, increased skeletal muscular tone, and spontaneous body movements occurred consistently with the 1,3,3,4-tetra-substituted-2-pyrrolidinones.

In contrast to the 1,3,3,4-tetra-substituted-2-pyrrolidinones and thionpyrrolidinones, nikethamide was found to exert a weak and transient stimulant effect on respiration. Intravenous doses of 40 to 80 mg./kg. were necessary to produce a modest effect on respiration. The respiratory effect of nikethamide was extremely brief in nature no matter what dose was used. Doses as high as 640 mg./kg. failed to elicit any observable analeptic effects such as a restoration of blink, corneal, or pain reflexes. Spontaneous body movements were never observed following treatment with nikethamide.

TABLE I.—COMPARATIVE ACTIVITY OF 1,3,3,4-TETRA-SUBSTITUTED-2-PYRROLIDINONES AND THION PYRROLIDINONES WITH NIKETHAMIDE

| AHR No. | A | R | AM | Minimum Effective IV Dose (mg./kg.) with regard to— | |
|---|---|---|---|---|---|
| | | | | Respiratory Stimulation | Analeptic Effects† |
| 578 | $C_6H_5$ | $C_2H_5$ | $-N(CH_3)_2$ | 0.5 | 0.5 |
| 621 | $C_6H_5$ | $C_2H_5$ | $-N(C_4H_9)_2$ | 2 | 8 |
| 619 | $C_6H_5$ | $C_2H_5$ | Morpholino | 0.1–1.0 | 0.1–1.0 |
| 632 | $C_6H_5$ | $i-C_3H_7$ | $-NH(CH_3)$ | 8 | 8 |
| 630 | $C_6H_5$ | $i-C_3H_7$ | $-N(CH_3)C(O)CH_3$ | 1 | 1 |
| 731 | $C_6H_5$ | $i-C_3H_7$ | $-CH_2NH_2$ | 4 | 4 |
| 739 | $C_6H_5$ | $i-C_3H_7$ | $-CH_2-$morpholino | 2 | 2 |
| 690 | $C_6H_5$ | $i-C_3H_7$ | $-N$(2,6-dimethylmorpholino) | 1 | 1 |
| 575 | $C_6H_5$ | $i-C_4H_9$ | $-N(CH_3)_2$ | 0.1–0.3 | 0.1–0.3 |
| 571 | $C_6H_5$ | $-C_6H_5-CH_2-$ | $-N(CH_3)_2$ | 0.6 | 1.2 |
| 722 | $i-C_3H_7$ | $i-C_3H_7$ | Morpholino | 2–4 | 8–32 |
| 671 | $cy-C_5H_9$ | $i-C_3H_7$ | do | 2 | 4 |
| 765 | $C_6H_5$ | $C_2H_5$ | do | 8 | 8 |
| 755 | $C_6H_5$ | $i-C_3H_7$ | do | 0.5–1 | 0.5–1 |
| Nikethamide | | | | 40–80 | >640 |

*E=oxygen (O) except compound AHR-755 where E=sulfur (S). R"=hydrogen (H) except compound AHR-765 where R"=methyl ($CH_3$).
†Analeptic Effects=one or more of the following: return of blink and/or corneal reflexes, increase skeletal muscular tone, body movements, head movements, ability to respond to auditory and/or visual stimuli.

Summary

The foregoing Table I shows clearly that all of the AHR compounds of this invention are far superior to nikethamide.

The activity of the active agents of the present invention, as evidenced by tests in lower animals, is indicative of utility based on their valuable activity in human beings as well as in lower animals. Clinical evalutation in human beings has not been entirely completed, however. It will be clearly understood that the distribution and marketing of any compound or composition falling within the scope of the present invention for use in human beings will of course have to be predicated upon prior approval by governmental agencies, such as the U.S. Federal Food and Drug Administration, which are responsible for and authorized to pass judgment on such questions.

Various modifications and equivalents will be apparent to one skilled in the art and may be made in the compounds, compositions, and methods of the present invention without departing from the spirit or scope thereof, and it is therefore to be understood that the invention is to be limited only by the scope of the appended claims.

We claim:
1. A process which comprises administering to a living animal body, for its analeptic effect, an effective amount of a compound selected from the group consisting of

(I) 4-(omega-substituted alkyl)-2-pyrrolidinones and -2-thionpyrrolidinones of the formula:

wherein AM is selected from the group consisting of
amino,
(lower-alkyl)-amino,
di-(lower-alkyl)-amino,
(lower-alkenyl)-amino,
di-(lower-alkenyl)-amino,
phenylamino,
(hydroxy-lower-alkyl)-amino,
di-(hydroxy-lower-alkyl)-amino,
piperidino,
(lower-alkyl)-piperidino,
poly-(lower-alkyl)-piperidino,
(lower-alkoxy)-piperidino,
pyrrolidino,
(lower-alkyl)-pyrrolidino,
poly-(lower-alkyl)-pyrrolidino,
(lower-alkoxy)-pyrrolidino,
piperazino,
N-(lower-alkyl)-piperazino,
C-(lower-alkyl)-piperazino,
poly-C-(lower-alkyl)-piperazino,
N-(lower-alkyl)-C-(lower-alkyl)-piperazino,
N-(hydroxy-lower-alkyl)-piperazino,
N-(lower-aliphatic acyloxy lower-alkyl)-piperazino,
(lower-alkoxy)-piperazino,
(lower-carbalkoxy)-piperazino,
N-lower-alkanoyl-N-lower-alkylamino,
N-lower-alkanoylamino,
phthalimido,
morpholino,
(lower-alkyl)-morpholino,
poly-(lower-alkyl)-morpholino,
(lower-alkoxy)-morpholino,
thiomorpholino,
(lower-alkyl)-thiomorpholino,
poly-(lower-alkyl)-thiomorpholino,
and (lower-alkoxy)-thiomorpholino, A is selected from the group consisting of lower-alkyl, cycloalkyl having up to a maximum of nine carbon atoms, monocarbocyclic aryl, and monocarbocyclic aralkyl, R is selected from the group consisting of lower-alkyl, lower-alkenyl, cycloalkyl having up to a maximum of nine carbon atoms, monocarbocyclic aryl, monocarbocyclic aralkyl, pyridyl, thienyl, and thenyl, R' is selected from the group consisting of lower-alkyl, lower-alkenyl, cycloalkyl having up to a maximum of nine carbon atoms, cycloalkenyl having up to a maximum of nine carbon atoms, and monocarbocyclic aralkyl, R" is selected from the group consisting of hydrogen and methyl, a maximum of one R" being other than hydrogen, Wherein E is selected from the group consisting of oxygen and sulfur, Wherein monocarbocyclic aryl and monocarbocyclic aralkyl has at most fifteen carbon atoms and has a radical which is selected from the group consisting of phenyl, nitrophenyl, lower-alkoxyphenyl, lower-alkylmercaptophenyl, lower-alkylphenyl, and halophenyl, and wherein "alkyl" in aralkyl is lower-alkyl, and wherein $n$ is selected from zero and one, and (II) pharmacologically acceptable acid addition salts thereof.

2. A process according to claim 1, wherein the active ingredient is administered together with a pharmaceutically acceptable carrier therefor and in an amount of about one to 100 milligrams.

3. The process of claim 2 wherein the active compound is 1 - lower - alkyl-3,3-diphenyl-4-($\beta$-morpholinoethyl)-2-pyrrolidinone.

4. The process of claim 2 wherein the active compound is 1 - lower - alkyl-3,3-diphenyl-4-($\beta$-morpholinoethyl)-2-pyrrolidinone pharmacologically acceptable acid addition salt.

5. The process of claim 2 wherein the active compound is 1 - ethyl - 3,3-diphenyl-4-($\beta$-morpholinoethyl)-2-pyrrolidinone pharmacologically acceptable acid addition salt.

6. The process of claim 2 wherein the active compound is 1 - ethyl - 3,3-diphenyl-4-($\beta$-morpholinoethyl)-2-pyrrolidinone hydrochloride.

7. The process of claim 2 wherein the active compound is 1 - methyl - 3,3 - diphenyl-4-($\beta$-morpholinoethyl)-2-pyrrolidinone.

8. The process of claim 2 wherein the active compound is 1 - lower - alkyl - 3,3-diphenyl-4-($\beta$-morpholinoethyl)-2-pyrrolidinethione pharmacologically acceptable acid addition salt.

9. The process of claim 2 wherein the active compound is 1 - isopropyl-3,3-diphenyl-4-($\beta$-morpholinoethyl)-2-pyrrolidinone pharmacologically acceptable acid addition salt.

10. The process of claim 2 wherein the active compound is 1-isopropyl-3,3-diphenyl-4-($\beta$-morpholinoethyl)-2-pyrrolidinone hydrochloride.

11. The process of claim 2 wherein the active compound is 1-lower-alkyl-3,3-diphenyl-4-[$\beta$-(methylmorpholino)-ethyl]-2-pyrrolidinone non-toxic acid addition salt.

12. The process of claim 2 wherein the active compound is 1-lower-alkyl-3,3-diphenyl-4-[$\beta$-(2,6-dimethylmorpholino)-ethyl]-2-pyrrolidinone pharmacologically acceptable acid addition salt.

13. The process of claim 2 wherein the active compound is 1-lower-alkyl-3,3-diphenyl-4-[$\beta$-(3,5-dimethylmorpholino)-ethyl]-2-pyrrolidinone pharmacologically acceptable acid addition salt.

14. The process of claim 2 wherein the active compound is 1 - lower - alkyl-3-cycloalkyl-3-phenyl-4-($\beta$-morpholinoethyl)-2-pyrrolidinone non-toxic acid salt, wherein the 3-cycloalkyl group has up to a maximum of nine carbon atoms.

15. The process of claim 2 wherein the active compound is 1-lower-alkyl-3,3-diphenyl-4-($\beta$-thiomorpholinoethyl)-2-pyrrolidinone pharmacologically acceptable acid addition salt.

16. The process of claim 2 wherein the active compound is 1 - lower-alkyl-3,3-diphenyl-4-(3-morpholino-2-propyl)-2-pyrrolidinone pharmacologically acceptable acid addition salt.

17. The process of claim 2 wherein the active compound is 1 - lower-alkyl-3,3-diphenyl-4-($\beta$-di-lower-alkylaminoethyl)-2-pyrrolidinone.

18. The process of claim 2 wherein the active compound is 1-lower-alkyl-3,3-diphenyl-4-($\beta$-di-lower-alkylamino-ethyl)-2-pyrrolidinone non-toxic acid addition salt.

19. The process of claim 2 wherein the active compound is 1-lower-alkyl-3,3-diphenyl-4-($\beta$-di-lower-alkylamino-ethyl)-2-pyrrolidinethione pharmacologically acceptable acid addition salt.

20. The process of claim 2 wherein the active compound is 1-lower-alkyl-3,3-diphenyl-4-($\beta$-aminoethyl)-2-pyrrolidinone.

21. The process of claim 2 wherein the active compound is 1 - lower - alkyl - 3 - cycloalkyl-3-phenyl-4-($\beta$-di-lower-alkylaminoethyl)-2-pyrrolidinone non-toxic acid addition salt, wherein the 3-cycloalkyl group has up to a maximum of nine carbon atoms.

22. The process of claim 2 wherein the active compound is 1-lower-alkyl-3,3-diphenyl-4-[$\beta$-(N-lower-alkanoyl-N-lower-alkylamino)-ethyl]-2-pyrrolidinone.

23. The process of claim 2 wherein the active compound is 1,3-di-lower-alkyl-3-phenyl-4-($\beta$-di-lower-alkylaminoethyl)-2-pyrrolidinone non-toxic acid addition salt.

24. The process of claim 2 wherein the active compound is 1-lower-alkyl-3,3-diphenyl-4-[β-(N-lower-alkyl-piperazino)-ethyl]-2-pyrrolidinone non-toxic acid addition salt.

25. A pharmaceutical composition, useful for its analeptic effect, comprising (a) an effective amount of about one of 100 milligrams of a compound selected from (I) compounds of the formula:

wherein AM is selected from the group consisting of
amino,
(lower-alkyl)-amino,
di-(lower-alkyl)-amino,
(lower-alkenyl)-amino,
di-(lower-alkenyl)-amino,
phenylamino,
(hydroxy-lower-alkyl)-amino,
di-(hydroxy-lower-alkyl)-amino,
piperidino,
(lower-alkyl)-piperidino,
poly-(lower-alkyl)-piperidino,
(lower-alkoxy)-piperidino,
pyrrolidino,
(lower-alkyl)-pyrrolidino,
poly-(lower-alkyl)-pyrrolidino,
(lower-alkoxy)-pyrrolidino,
piperazino,
N-(lower-alkyl)-piperazino,
C-(lower-alkyl)-piperazino,
poly-C-(lower-alkyl)-piperazino,
N-(lower-alkyl)-C-(lower-alkyl)-piperazino,
N-(hydroxy-lower-alkyl)-piperazino,
N-(lower-aliphatic acyloxy lower-alkyl)-piperazino,
(lower-alkoxy)-piperazino,
(lower-carbalkoxy)-piperazino,
N-lower-alkanoyl-N-lower-alkylamino,
N-lower-alkanoylamino,
phthalimido,
morpholino,
(lower-alkyl)-morpholino,
poly-(lower-alkyl)-morpholino,
(lower-alkoxy)-morpholino,
thiomorpholino,
(lower-alkyl)-thiomorpholino,
poly-(lower-alkyl)-thiomorpholino, and
(lower-alkoxy)-thiomorpholino, A is selected from the group consisting of lower-alkyl, cycloalkyl having up to a maximum of nine carbon atoms, monocarbocyclic aryl, and monocarbocyclic aralkyl, R is selected from the group consisting of lower-alkyl, lower-alkenyl, cycloalkyl having up to a maximum of nine carbon atoms, monocarbocyclic aryl, monocarbocyclic aralkyl, pyridyl, thienyl, and thenyl, R' is selected from the group consisting of lower-alkyl, lower-alkenyl, cycloalkyl having up to a maximum of nine carbon atoms, cycloalkenyl having up to a maximum of nine carbon atoms, and monocarbocyclic aralkyl, R" is selected from the group consisting of hydrogen and methyl, a maximum of one R" being other than hydrogen, Wherein E is selected from the group consisting of oxygen and sulfur, Wherein monocarbocyclic aryl and monocarbocyclic aralkyl has at most fifteen carbon atoms and has a radical which is selected from the group consisting of phenyl, nitrophenyl, lower-alkoxyphenyl, lower-alkylmercaptophenyl, lower-alkylphenyl, and halophenyl, and wherein "alkyl" in aralkyl is lower-alkyl, and wherein $n$ is selected from zero and one, and (II) pharmacologically acceptable acid addition salts thereof, and (b) a pharmaceutically acceptable carrier therefor.

26. A composition according to claim 25, wherein the active ingredient is 1-lower-alkyl-3,3-diphenyl-4-(β-morpholinoethyl)-2-pyrrolidinone.

27. A composition according to claim 25, wherein the active ingredient is 1-lower-alkyl-3,3-diphenyl-4-(β-morpholinoethyl)-2-pyrrolidinone pharmacologically acceptable acid addition salt.

28. A composition according to claim 25, wherein the active ingredient is 1-ethyl-3,3-diphenyl-4-(β-morpholinoethyl)-2-pyrrolidinone pharmacologically acceptable acid addition salt.

29. A composition according to claim 25, wherein the active ingredient is 1-ethyl-3,3-diphenyl-4-(β-morpholinoethyl)-2-pyrrolidinone hydrochloride.

30. A composition according to claim 25, wherein the active ingredient is 1-methyl-3,3-diphenyl-4-(β-morpholinoethyl)-2-pyrrolidinone.

31. A composition according to claim 25, wherein the active ingredient is 1-lower-alkyl-3,3-diphenyl-4-(β-morpholinoethyl)-2-pyrrolidinethione pharmacologically acceptable acid addition salt.

32. A composition according to claim 25, wherein the active ingredient is 1-isopropyl-3,3-diphenyl-4-(β-morpholinoethyl)-2-pyrrolidinone pharmacologically acceptable acid addition salt.

33. A composition according to claim 25, wherein the active ingredient is 1-isopropyl-3,3-diphenyl-4-(β-morpholinoethyl)-2-pyrrolidinone hydrochloride.

34. A composition according to claim 25, wherein the active ingredient is 1-lower-alkyl-3,3-diphenyl-4-[β-(methylmorpholino)-ethyl]-2-pyrrolidinone non-toxic acid addition salt.

35. A composition according to claim 25, wherein the active ingredient is 1-lower-alkyl-3,3-diphenyl-4-[β-(2,6-dimethylmorpholino)-ethyl]-2-pyrrolidinone pharmacologically acceptable acid addition salt.

36. A composition according to claim 25, wherein the active ingredient is 1-lower-alkyl-3,3-diphenyl-4-[β-(3,5-dimethylmorpholino)-ethyl]-2-pyrrolidinone pharmacologically acceptable acid addition salt.

37. A composition according to claim 25, wherein the active ingredient is 1-lower-alkyl-3-cycloalkyl-3-phenyl-4-(β-morpholinoethyl)-2-pyrrolidinone non-toxic acid addition salt, wherein the 3-cycloalkyl group has up to a maximum of nine carbon atoms.

38. A composition according to claim 25, wherein the active ingredient is 1-lower-alkyl-3,3-diphenyl-4-(β-thiomorpholinoethyl)-2-pyrrolidinone pharmacologically acceptable acid addition salt.

39. A composition according to claim 25, wherein the active ingredient is 1-lower-alkyl-3,3-diphenyl-4-(3-morpholino-2-propyl)-2-pyrrolidinone pharmacologically acceptable acid addition salt.

40. A composition according to claim 25, wherein the active ingredient is 1-lower-alkyl-3,3-diphenyl-4-(β-di-lower-alkylamino-ethyl)-2-pyrrolidinone.

41. A composition according to claim 25, wherein the active ingredient is 1-lower-alkyl-3,3-diphenyl-4-(β-di-lower-alkylamino-ethyl)-2-pyrrolidinone non-toxic acid addition salt.

42. A composition according to claim 25, wherein the active ingredient is 1-lower-alkyl-3,3-diphenyl-4-(β-di-lower-alkylamino-ethyl)-2-pyrrolidinethione pharmacologically acceptable acid addition salt.

43. A composition according to claim 25, wherein the active ingredient is 1-lower-alkyl-3,3-diphenyl-4-(β-aminoethyl)-2-pyrrolidinone.

44. A composition according to claim 25, wherein the active ingredient is 1-lower-alkyl-3-cycloalkyl-3-phenyl-4-(β-di-lower-alkylaminoethyl)-2-pyrrolidinone non-toxic acid addition salt, wherein the 3-cycloalkyl group has up to a maximum of nine carbon atoms.

45. A composition according to claim 25, wherein the active ingredient is 1-lower-alkyl-3,3-diphenyl-4-[β-(N-lower-alkanoyl-N-lower-alkyl amino)-ethyl]-2-pyrrolidinone.

46. A composition according to claim 25, wherein the active ingredient is 1,3-di-lower-alkyl-3-phenyl-4-(β-di-lower-alkylamino-ethyl)-2-pyrrolidinone non-toxic acid addition salt.

47. A composition according to claim 25, wherein the active ingredient is 1-lower-alkyl-3,3-diphenyl-4-[β-(N-lower-alkylpiperazino)-ethyl]-2-pyrrolidinone non-toxic acid addition salt.

No references cited.

JULIAN S. LEVITT, *Primary Examiner.*

S. J. FRIEDMAN, *Assistant Examiner.*

UNITED STATES PATENT OFFICE
CERTIFICATE OF CORRECTION

Patent No. 3,301,757                                January 31, 1967

Carl D. Lunsford, et al.

It is hereby certified that error appears in the above numbered patent requiring correction and that the said Letters Patent should read as corrected below.

Column 3, line 13, for "alkeny)" read -- alkenyl) --; line 18, for "alkly" read -- alkyl --; line 74, for "thiopyrrolidinone" read -- thionpyrrolidinone --; column 10, TABLE I, sixth column, line 2 thereof, for "S" read -- 8 --.

Signed and sealed this 17th day of October 1967.

(SEAL)
Attest:

Edward M. Fletcher, Jr.                               EDWARD J. BRENNER
Attesting Officer                                          Commissioner of Patents